United States Patent [19]

Marshall

[11] Patent Number: 4,606,972
[45] Date of Patent: Aug. 19, 1986

[54] POLYAMIDE YARN WITH ANTIOXIDANT FINISH

[75] Inventor: Robert M. Marshall, Chester, Va.

[73] Assignee: Allied Corporation, Morris Township, Morris County, N.J.

[21] Appl. No.: 773,682

[22] Filed: Sep. 9, 1985

[51] Int. Cl.$^4$ ............................................. D02G 3/48
[52] U.S. Cl. ....................................... 428/395; 57/250; 57/258; 57/902; 252/8.8; 428/494; 428/501
[58] Field of Search ............... 252/8.8; 428/395, 494, 428/501; 57/902, 250, 258

[56] References Cited

U.S. PATENT DOCUMENTS

| | | | |
|---|---|---|---|
| 1,906,935 | 5/1933 | Horst. | |
| 1,975,167 | 10/1934 | Meuser. | |
| 2,002,642 | 5/1935 | Meuser et al.. | |
| 2,562,802 | 7/1951 | Mankowich et al.. | |
| 3,003,995 | 10/1961 | Schule. | |
| 3,113,120 | 12/1963 | Papero et al.. | |
| 3,397,081 | 8/1968 | Mayberry. | |
| 3,417,142 | 12/1968 | Morgana. | |
| 4,129,507 | 12/1978 | Marshall et al. | 252/8.9 |
| 4,371,658 | 2/1983 | Marshall et al. | 524/585 |
| 4,469,606 | 9/1984 | Reid et al. | 252/8.8 |

OTHER PUBLICATIONS

*Chemical Abstracts* 67(8): 33265b.
*Chemical Abstracts* 68(8): 30906w.
*Chemical Abstracts* 80(4): 16081g.
*Chemical Abstracts* 92(22): 182463b.

*Primary Examiner*—James C. Cannon
*Attorney, Agent, or Firm*—William H. Thrower

[57] ABSTRACT

An improved polyamide yarn for tire and industrial applications is prepared by applying to the yarn a finish composition comprising a diarylamine-ketone condensation product such as the low temperature reaction product of diphenylamine and acetone, and a compound selected from the group consisting of 1,3,5 tris(4t-butyl-3-hydroxy-2,6 dimethylbenzyl)-1,3,5 triazine-2,4,6(1H, 3H, 5H) trione and 1,3,5 tris(2 hydroxy ethyl)-s-triazine-2,4,6(1H, 3H, 5H) trione in effective amounts to provide improved adhesion of the fiber to rubber after aging the yarn.

11 Claims, No Drawings

POLYAMIDE YARN WITH ANTIOXIDANT FINISH

BACKGROUND OF THE INVENTION

The present invention relates to improved polyamide yarn and to an improved fiber finishing process for polyamide yarn in which fiber finish compositions containing a novel blend of antioxidant compounds are applied to the yarn. The yarns of the invention are of particular interest in the production of tire cord and other industrial applications and display unexpected improvement in aging properties, particularly fiber-to-rubber adhesion retention.

Stabilized polyamide compositions incorporating copper compounds together with diarylamine antioxidants into the polymer are disclosed in U.S. Pat. No. 3,113,120 to Papero et al. Such compositions display resistance to deteriorating effects of light, weathering, and heat. Polyamide compositions incorporating an aging inhibitor which is a diphenylamine-acetone condensation product are disclosed in U.S. Pat. No. 3,003,995 to Schule.

Representative finishes for polyamide yarn to be processed into tire cord include U.S. Pat. Nos. 4,129,507 to Marshall et al. and 4,371,658 to Marshall et al. U.S. Pat. No. 3,397,081 to Mayberry discloses a finish composition for nylon tire cord which includes the low temperature reaction product of diphenylamine and acetone. U.S. Pat. No. 4,469,606 to Reid et al. discloses a fiber treating composition comprising a mixture of a specified triazine together with a multifunctional hindered phenol.

Applicant has discovered that by applying a novel combination of antioxidant compounds to the surface of the polyamide yarn, preferably after drawing, such yarns display unexpected improvement in aging properties, particularly the retention of fiber to rubber adhesion, a property essential to tire cord applications.

SUMMARY OF THE INVENTION

A fiber finish comprising effective amounts of a diarylamine-ketone condensation product such as the low temperature reaction product of diphenylamine and acetone, and a compound selected from the group consisting of 1,3,5 tris(4t-butyl-3-hydroxy-2,6-dimethylbenzyl)-1,3,5 triazine-2,4,6(1H, 3H, 5H) trione and 1,3,5 tris (2 hydroxy ethyl)-s-triazine-2,4,6(1H, 3H, 5H) trione, and compounds similar thereto, when applied to the surface of a polyamide yarn for processing into tire cord, provides enhanced aging properties for the tire cord, particularly the retention of fiber-to-rubber adhesion after exposure of the tire cord to aging conditions.

DESCRIPTION OF THE PREFERRED EMBODIMENT

A mixture of antioxidant compounds including a diarylamine-ketone condensation product and certain multifunctional hindered phenolic compounds, when applied to a polyamide yarn for tire cord yields enhanced properties after aging, particularly improved retention of fiber-to-rubber adhesion.

The antioxidant compounds of the invention are preferable combined with compatible finishes and applied to the polyamide yarn in a conventional manner. A preferred manner is to apply the compounds with a compatible overfinish to the polyamide yarn at a point after the drawing has been completed, for example during the beaming operation, thus avoiding any processing problems which may result from the critical process conditions required for drawing.

The diarylamine-ketone condensation products which comprise one component of the blend of antioxidants of this invention are well known as a distinct class among the various classes of rubber antioxidant compounds. Pertinent patent disclosures relating to diarylamine-ketone condensation products as used in this invention include U.S. Pat. Nos. 1,906,935, 1,975,167, 2,002,642, and 2,562,802. Specific products which may be utilized in the invention include "Aminox" supplied by Uniroyal, Inc., described as a low temperature reaction product of diphenylamine and acetone with a melting point of 85° to 95° C. It is expected that known diarylamine-ketone condensation products may be utilized as well.

The second component of the blend of antioxidants is selected from the group consisting of 1,3,5 tris(4t-butyl-3hydroxyl-2,6-dimethylbenzyl)-1,3,5 triazine-2,4,6(1H, 3H, 5H) trione, available under the trade name "Cyanox 1790" from American Cyanamid, and 1,3,5 tris(2 hydroxyl ethyl)-s-triazine2,4,6(1H, 3H, 5H) trione available as "Agerite SKT" from R. T. Vanderbilt Company. Structurally similar multifunctional hindered phenol compounds are contemplated to be within the scope of the invention.

With respect to proportions of the two components of the combination in the finish composition of this invention, it is sufficient to include an effective amount of each component to obtain enhanced aged adhesion retention for tire cord over that obtainable by an equivalent weight of either component alone, a preferred weight ratio of diarylamine-ketone condensation product to multifunctional hindered phenolic compound being from 8:1 to 1:1. The finished yarn must have an effective amount of the two components applied to the surface thereof, preferably at least 100 ppm of the combined antioxidant compounds based on the weight of the yarn, more preferably at least 150 ppm. Based on the weight of the yarn, it is preferred that there be at least about 80 ppm of the diarylamine-ketone condensation product, more preferably at least 120 ppm, and that there be at least about 20 ppm of the hindered phenolic compound, more preferably at least 30 ppm.

The aging properties of interest in tire cord applications particularly include fiber to rubber adhesion of tire cord made from the yarn after aging of the tire cord. In tire cord applications it is essential that the cord made from the yarn, after treatment with resorcinol-formaldehyde-latex and after then being subjected to aging conditions such as exposure to long periods of warehouse storage and extremes of temperature and humidity, still display acceptable levels of fiber to rubber adhesion.

In the examples which follow, yarn was overfinished with the respective antioxidant compounds, twisted into three-ply cords, and prepared for tire application by treatment with a standard resorcinol-formaldehyde-latex dip in a conventional manner. The treated cord was subjected to aging simulation conditions of 8 hours at 300° F. and 40 psi. Following exposure to aging conditions the cords were then subjected to the "U" adhesion test to measure fiber to rubber adhesion.

The "U" adhesion test procedure covers the fabrication and vulcanization of "U" adhesion specimens used in determining the static adhesion of tire cord to rubber.

The "U" test is designed to measure the force required to pull a cord in the direction of its axis, from a strip of rubber in which the ends of the cord are embedded in the same rubber strip with the cord forming a "U" from which the test derives its name. The test is conducted substantially in accordance with ASTM D2138.

In the examples which follow test specimens of the cords were prepared in a consistent manner by placing a ¼-inch rubber strip in a mold, placing a test cord in a loop configuration to form a "U" on top of the rubber strip, placing a ¼-inch rubber strip on top of the cord and curing in a preheated press for 40 minutes at 300° F. under a 17-ton load. Similar specimens are prepared for test cords which have not been exposed to aging conditions.

The specimens are pulled on an Instron tester. Reported below is the percent "U" adhesion retained by the aged samples compared with the similar unaged samples.

EXAMPLE 1

Initially, a series of antioxidants and organic copper compounds were screened in overfinishes for effect on polyamide aged adhesion. Throughout the tests a drawn polyamide yarn of 1260 denier 204 filaments without any antioxidant compound incorporated in the polymer itself was utilized for overfinishing and for a control (Control I) without overfinish. A polyamide containing antioxidant incorporated in the polymer (Control II) was also used as a control. A nonionic finish based on rearranged glycerides was utilized as a spin finish for both yarns (Control I and Control II) at a targeted application of about 0.8 percent finish on the weight of the fiber.

Table 1 shows the results of initial screening, with the percent "U" adhesion retained for the particular compounds. The compounds listed were each applied to drawn polyamide yarn corresponding to Control I in an amount targeted to yield about 500 ppm of the antioxidant compound on the surface of the yarn with respect to the weight of the yarn. "Aminox" diphenylamine-acetone reaction product supplied by Uniroyal Chemical showed improved aged adhesion, while copper compounds on the fiber surface did not improve adhesion retention.

TABLE 1
ANTIOXIDANT AND COPPER COMPOUNDS IN OVERFINISHES

| Compound | Percent "U" Adhesion Retained |
| --- | --- |
| Antioxidant 736 (phosphate ester of hindered hydroquinone- available from Ethyl Corp.) | 32 |
| Ionol (2,6 ditertiary-butyl, 4 methyl phenol) | 18 |
| Copper Hydronapthalene | 18 |
| Copper Stearate | 18 |
| Cupric Ethylacetate | 17 |
| Aminox (diphenylamine-acetone reaction product) | 55 |
| Naugard 445 (secondary amine- from Uniroyal) | 39 |
| Control I | 20 |
| Control II | 70 |

EXAMPLE 2

A second series of antioxidants and antioxidant blends were screened by applying the compounds listed below in a nonionic rearranged glyceride carrier system as an overfinish on polyamide yarn in an amount targeted to yield about 500 ppm of the antioxidant on the surface of the yarn with respect to the weight of the yarn. The blends included equal amounts of each component. The effect on aged adhesion was evaluated as above. Results are given in Table 2. The blend of "Aminox" and "Cyanox 1790" showed unexpected improvement in adhesion retention. Additionally, "Bail" was applied in a modified mineral oil carrier system to compare a different carrier, and showed 46 percent "U" adhesion retained.

TABLE 2
ANTIOXIDANTS IN OVERFINISH

| Compound | Percent "U" Adhesion Retained |
| --- | --- |
| Antioxidant 736 (2,6 ditert-butyl dimethylamino-p-cresol) | 39 |
| "Cyanox" 1790 (available from American Cyanamid) | 39 |
| "Irganox" 1076 (hindered phenol-available from Ciba Geigy) | 39 |
| "Bail" (4,4'-Butylidenebis- (6-tert-butyl-m-cresol- available from Monsanto) | 45 |
| "Bail" + "Aminox" | 48 |
| "Bail" + "Cyanox 1790" | 47 |
| "Aminox" + "Cyanox 1790" | 65 |
| Control I | 15 |
| Controll II | 67 |

EXAMPLE 3

A study of the following overfinishes was conducted:

| Component | Finish 1 | Finish 2 | Finish 3 | Finish 4 |
| --- | --- | --- | --- | --- |
| Caplube 8369 (rearranged coconut oil- available from Capital City Products, Inc.) | 52% | 41% | 43% | 38% |
| Ethox CO-16 (POE (16) castor oil from Ethox Chemical Co.) | 18 | 18 | 18 | 18 |
| Ethox OA-9 (POE (9) oleyl ether from Ethox Chemical Co.) | 25 | 25 | 25 | 25 |
| Igepal CO-630 (available from GAF Corp.) | 5 | 5 | 5 | 5 |
| "Aminox" | — | 8 | 8 | 8 |
| "Cyanox 1790" | — | 3 | 1 | 6 |

Amounts given in weight percent.

To determine appropriate level amounts on fiber, the following amounts were applied (given in ppm of antioxidant to fiber weight) and adhesion retention tested as described above. Optimum levels appear to be from about 150 to about 200 ppm of the antioxidant compounds. High levels are poorer because of the additional finish required to put on more antioxidant.

| Finish | Antioxidant Applied, ppm | Percent "U" Adhesion Retained |
| --- | --- | --- |
| 2 | 135 | 26 |

-continued

| Finish | Antioxidant Applied, ppm | Percent "U" Adhesion Retained |
|---|---|---|
| 2 | 105 | 35 |
| 2 | 165 | 90 |
| 2 | 187 | 97 |
| 2 | 225 | 83 |
| 2 | 396 | 84 |
| 2 | 490 | 76 |
| None - Control I | — | 15 |
| None - Control II | — | 90 |

To determine ratios of the blend of antioxidants, the following data was obtained:

| Finish | Antioxidant Applied, ppm | Percent "U" Adhesion Retained |
|---|---|---|
| 2 | 190 | 95 |
| 3 | 210 | 83 |
| 4 | 195 | 76 |
| Control I | — | 20 |
| Control II | — | 91 |

What is claimed is:

1. A finish composition for polyamide yarn to be processed into tire cord, said finish composition comprising a diarylamine-ketone condensation product and a compound selected from the group consisting of 1,3,5 tris(4t-butyl-3-hydroxy-2,6-dimethylbenzyl)-1,3,5 triazine-2,4,6(1H, 3H, 5H) trione and 1,3,5 tris(2 hydroxy ethyl)-s-triazine-2,4,6(1H, 3H, 5H) trione, said condensation product and said compound being present in amounts sufficient to provide enhanced aged adhesion retention of said tire cord to rubber.

2. The composition of claim 1 wherein said condensation product is a low temperature reaction product of diphenylamine and acetone.

3. Polyamide yarn to be processed into tire cord having deposited thereon the composition of claim 1.

4. The polyamide yarn of claim 3 having deposited thereon at least about 80 ppm of said condensation product and at least about 20 ppm of said compound, based on the weight of the yarn.

5. The polyamide yarn of claim 4 having deposited thereon at least 120 ppm of said condensation product and at least 30 ppm of said compound.

6. The polyamide yarn of claim 3 wherein said condensation product is a low temperature reaction product of diphenylamine and acetone.

7. The polyamide yarn of claim 6 having deposited thereon at least about 80 ppm of said condensation product and at least about 20 ppm of said compound, based on the weight of the yarn.

8. The polyamide yarn of claim 7 wherein said compound is 1,3,5 tris(4t-butyl-3-hydroxyl-2,6-dimethylbenzyl)-1,3,5 triazine-2,4,6(1H, 3H, 5H) trione.

9. The polyamide yarn of claim 7 having deposited thereon at least 120 ppm of said condensation product and at least 30 ppm of said compound.

10. The polyamide yarn of claim 9 wherein said compound is 1,3,5 tris(4t-butyl-3-hydroxyl-2,6-dimethylbenzyl)-1,3,5 triazine-2,4,6(1H, 3H, 5H) trione.

11. A method of producing polyamide yarn to be processed into tire cord, said method comprising applying to drawn polyamide yarn the finish composition of claim 1 in an amount sufficient to provide enhanced aged adhesion retention of said tire cord to rubber.

* * * * *